United States Patent Office 2,801,202
Patented July 30, 1957

2,801,202

COMPOSITIONS CONTAINING CORTISONE OR HYDROCORTISONE WITH PHENYLEPHRINE

Chester E. Poetsch, Moorestown, N. J., assignor to Smith, Kline & French Laboratories, Philadelphia, Pa., a corporation of Pennsylvania No Drawing. Application December 24, 1954,
Serial No. 477,581

4 Claims. (Cl. 167—77)

This invention relates to a medicinal preparation having particular utility for the treatment of rhinitis and dermatoses. The preparation in accordance with this invention has a high degree of anti-inflammatory activity.

The preparation of this invention has as its essential active ingredients an adrenocortical steroid and phenylephrine or a non-toxic organic or inorganic salt of phenylephrine, such as phenylephrine hydrochloride, phenylephrine tartrate, phenylephrine maleate, phenylephrine phosphate or phenylephrine sulfate.

More specifically, the adrenocortical steroid will be 11-dehydro-17-α-hydroxycorticosterone (cortisone), 17-α-hydroxycorticosterone (hydrocortisone), 9-fluoro-11-dehydro-17-α-hydroxycorticosterone, 9-fluoro-17-α-hydroxycorticosterone, 9-chloro-11-dehydro-17-α-hydroxycorticosterone or 9-chloro-17-α-hydroxycorticosterone. Where 11-dehydro-17-α-hydroxycorticosterone, 17-α-hydroxycorticosterone, 9-fluoro-11-dehydro-17-α-hydroxycorticosterone, 9-fluoro-17-α-hydroxycorticosterone, 9-chloro-11-dehydro-17-α-hydroxycorticosterone and 9-chloro-17-α-hydroxycorticosterone are used in the specification and claims, they are intended to cover their equivalents, such as their esters, as, for example, the propionate, butyrate, pentanoate, caprylate, maleate, fumarate, citrate, benzoate, caprioate, succinate, acetate or tricarballyate esters.

The phenylephrine and the selected adrenocortical steroid are synergistic, that is, together their anti-inflammatory action is unexpectedly greater than would be expected from the addition of their individual actions.

Thus, for example, in using the preparation as an anti-inflammatory agent, the adrenocortical steroid selected can be used in unusually small amounts with the achievement of a high degree of anti-inflammatory action. This is highly advantageous since it markedly reduces the undesirable steroid induced systemic side effects, such as pituitary suppression. Further, the greatly reduced amount of the selected steroid required results in a marked reduction in the cost of the preparation.

The essential ingredients will be added to an extender or diluent and be in any conventional physical form, such as a solution, in suspension, in a lotion, or an emulsion to form the final preparation. Isotonic saline solutions, isotonic dextrose solutions, and isotonic buffer solutions are exemplary of suitable vehicles where a solution is desired. For maximum stability of the alcohol form of the steroids the preparation desirably has a pH of 4.5 to 6.0. Bentonite magma, 2% methyl cellulose, or similar lotions of the gum or emulsion type are useful as the vehicle where a suspension is desired.

The selected steroid may be present in the preparation of this invention in an amount of from about 0.001% to about 2.0% by weight of the preparation, preferably from about 0.01% to about 2.0% by weight of the preparation and advantageously from about 0.01% to about 1.5% by weight of the preparation. It is most advantageous to have the selected steroid present in the preparation of this invention in an amount of from about 0.005% to about 0.5% by weight of the preparation as exemplified by the specific examples set forth hereinafter. The phenylephrine may be present in an amount of from about 0.08% to about 0.5% by weight of the preparation, preferably from about 0.1% to about 0.3% by weight of the preparation and advantageously from about 0.1% to about 0.25% by weight of the preparation.

The following examples will serve to specifically illustrate the invention:

Example 1

| | Percent w./v. |
|---|---|
| Hydrocortisone (17-α-hydroxycorticosterone) | 0.005 |
| Phenylephrine tartrate | 0.085 |
| Alcohol U. S. P | 1.000 |
| Potassium biphthalate | 0.090 |
| Sodium citrate | 0.210 |
| Thimerosal N.F | 0.001 |
| Sodium chloride | 0.321 |
| Water, q. s. to make total volume of 100 cc. | |

Approximately 80% of the water was admixed with all of the ingredients except the hydrocortisone and alcohol. The hydrocortisone was dissolved in the alcohol with the aid of a little heat and added to the solution formed in the first step with stirring. The thus mixed ingredients were then filtered and sufficient water was added to make the total volume equal to 100 cc.

Example 2

| | Percent w./v. |
|---|---|
| Hydrocortisone (17-α-hydroxycorticosterone) | 0.020 |
| Alcohol U. S. P | 1.000 |
| Phenylephrine HCl | 0.125 |
| Hydroxy amphetamine HBr | 0.500 |
| Potassium biphthalate | 0.090 |
| Sodium citrate | 0.210 |
| Glycerin | 1.000 |
| Sodium bisulfite | 0.100 |
| Thimerosal N. F | 0.001 |
| Water, q. s. to make total volume of 100 cc. | |

The procedure set forth in Example 1 was followed.

Example 3

| | Percent w./v. |
|---|---|
| Hydrocortisone (17-α-hydroxycorticosterone) | 0.020 |
| Alcohol U. S. P | 1.000 |
| Phenylephrine HCl | 0.250 |
| Potassium bipthalate | 0.090 |
| Sodium citrate | 0.210 |
| Sodium bisulfite | 0.100 |
| Thimerosal N. F | 0.001 |
| Water, q. s. to make total volume of 100 cc. | |

The procedure set forth in Example 1 was followed.

Example 4

| | Percent w./v. |
|---|---|
| Hydrocortisone succinate (17-α-hydroxycorticosterone succinate) | 0.20 |
| Phenylephrine | 0.50 |
| Stearic acid | 15.00 |
| Sorbitan monostearate (Span 60, Atlas) | 0.30 |
| Polyoxyethylene sorbitan monostearate (Tween 60, Atlas) | 3.20 |
| Propylparaben | 0.03 |
| Butyl-p-hydroxybenzoate | 0.02 |
| Ethyl alcohol | 5.00 |
| Distilled water | 75.75 |

To form the oil phase, the stearic acid, the sorbitan monostearate and the polyoxyethylene sorbitan monostearate were heated to 60° C. With rapid mixing, the propylparaben, butyl-p-hydroxybenzoate and phenylephrine were added. To form the aqueous phase, the hydrocortisone succinate was dissolved in the alcohol. The thus formed alcohol solution was added to the distilled water heated to 65° C. The oil phase at 60° C. was added to the aqueous phase at 65° C. and mixed until cool.

*Example 5*

| | Percent w./v. |
|---|---|
| Hydrocortisone (17-α-hydroxycorticosterone) | 0.20 |
| Phenylephrine hydrochloride | 0.25 |
| Stearic acid | 15.00 |
| Sorbitan monostearate (Span 60, Atlas) | 0.30 |
| Polyoxyethylene Sorbitan monostearate (Tween 60, Atlas) | 3.20 |
| Propylparaben | 0.03 |
| Butyl-p-hydroxybenzoate | 0.02 |
| Ethyl alcohol | 5.00 |
| Distilled water | 75.00 |

The procedure set forth in Example 4 was followed.

*Example 6*

| | Percent w./v. |
|---|---|
| Hydrocortisone (17-α-hydroxycorticosterone) | 0.50 |
| Phenylephrine HCl | 0.10 |
| Stearic acid | 15.00 |
| Sorbitan monostearate (Span 60, Atlas) | 0.30 |
| Polyoxyethylene sorbitan monostearate (Tween 60, Atlas) | 3.20 |
| Propylparaben | 0.03 |
| Butyl-p-hydroxybenzoate | 0.02 |
| Ethyl alcohol | 5.00 |
| Distilled water | 75.45 |

The procedure set forth in Example 4 was followed.

*Example 7*

| | Percent w./v. |
|---|---|
| Cortisone (11-dehydro-17-α-hydroxycorticosterone) | 0.020 |
| Alcohol U. S. P | 1.000 |
| Phenylephrine HCl | 0.125 |
| Hydroxy amphetamine HBr | 0.500 |
| Potassium biphthalate | 0.090 |
| Sodium citrate | 0.210 |
| Glycerin | 1.000 |
| Sodium bisulfite | 0.100 |
| Thimerosal N. F | 0.001 |
| Water, q. s. to make total volume of 100 cc. | |

The procedure set forth in Example 1 was followed.

*Example 8*

| | Percent w./v. |
|---|---|
| Cortisone (11-dehydro-17-α-hydroxycorticosterone) | 0.020 |
| Alcohol U. S. P | 1.000 |
| Phenylephrine HCl | 0.250 |
| Potassium biphthalate | 0.090 |
| Sodium citrate | 0.210 |
| Sodium bisulfite | 0.100 |
| Thimerosal N. F | 0.001 |
| Water, q. s. to make total volume of 100 cc. | |

The procedure set forth in Example 1 was followed.

*Example 9*

| | Percent w./v. |
|---|---|
| 9-fluoro-11-dehydro-17-α-hydroxycorticosterone | 0.005 |
| Alcohol U. S. P | 1.000 |
| Phenylephrine HCl | 0.250 |
| Potassium biphthalate | 0.090 |
| Sodium citrate | 0.210 |
| Sodium bisulfite | 0.100 |
| Thimerosal N. F | 0.001 |
| Water, q. s. to make total volume of 100 cc. | |

The procedure set forth in Example 1 was followed.

*Example 10*

| | Percent w./v. |
|---|---|
| 9-fluoro-17-α-hydroxycorticosterone | 0.005 |
| Alcohol U. S. P | 1.000 |
| Phenylephrine HCl | 0.125 |
| Hydroxy amphetamine HBr | 0.500 |
| Potassium biphthalate | 0.090 |
| Sodium citrate | 0.210 |
| Glycerin | 1.000 |
| Sodium bisulfite | 0.100 |
| Thimerosal N. F | 0.001 |
| Water, q. s. to make total volume of 100 cc. | |

The procedure set forth in Example 1 was followed.

*Example 11*

| | Percent w./v. |
|---|---|
| 9-chloro-11-dehydro-17-α-hydroxycorticosterone | 0.02 |
| Alcohol U. S. P | 1.000 |
| Phenylephrine HCl | 0.250 |
| Potassium biphthalate | 0.090 |
| Sodium citrate | 0.210 |
| Sodium bisulfite | 0.100 |
| Thimerosal N. F | 0.001 |
| Water, q. s. to make total volume of 100 cc. | |

The procedure set forth in Example 1 was followed.

*Example 12*

| | Percent w./v. |
|---|---|
| 9-chloro-17-α-hydroxycorticosterone | 0.01 |
| Alcohol U. S. P | 1.000 |
| Phenylephrine HCl | 0.125 |
| Hydroxy amphetamine HBr | 0.500 |
| Potassium biphthalate | 0.090 |
| Sodium citrate | 0.210 |
| Glycerin | 1.000 |
| Sodium bisulfite | 0.100 |
| Thimerosal N. F | 0.001 |
| Water, q. s. to make total volume of 100 cc. | |

The procedure set forth in Example 1 was followed.

It is not desired to be limited except as set forth in the appended claims.

This application is a continuation-in-part of application Serial No. 369,727, filed July 22, 1953

What is claimed is:

1. An anti-inflammatory preparation comprising from about 0.005% to about 0.5% by weight of the preparation of a member selected from a group consisting of 11-dehydro-17-α-hydroxycorticosterone and 17-α-hydroxycorticosterone, and from about 0.08% to about 0.5% by weight of the preparation of a member selected from a group consisting of phenylephrine and a non-toxic salt of phenylephrine.

2. An anti-inflammatory preparation comprising from about 0.005% to about 0.5% by weight of the preparation of a member selected from a group consisting of 11-dehydro-17-α-hydroxycorticosterone and 17-α-hydroxycorticosterone, and from about 0.08% to about 0.5% by weight of the preparation of a member selected from a group consisting of phenylephrine and a non-toxic salt of phenylephrine and a pharmaceutical carrier.

3. An anti-inflammatory preparation comprising from about 0.01% to about 0.5% by weight of the preparation of 11-dehydro-17-α-hydroxycorticosterone and from about 0.08% to about 0.5% by weight of the preparation of a member selected from the group consisting of phenylephrine and a non-toxic salt of phenylephrine and a pharmaceutical carrier.

4. An anti-inflammatory preparation comprising from about 0.01% to about 0.5% by weight of the preparation of 17-α-hydroxycorticosterone and from about 0.08% to about 0.5% by weight of the preparation of a member selected from the group consisting of phenylephrine and a non-toxic salt of phenylephrine and a pharmaceutical carrier.

References Cited in the file of this patent

UNITED STATES PATENTS 2,786,835   Pinson _____ Mar. 26, 1957

OTHER REFERENCES

Federation Proceedings, 12:1, part I, p. 66, Mar. 1953.

Current Therapy, Conn, 1952, Saunders Co., Philadelphia, Pa., p. 494.

Kurland et al.: Proceedings Soc. for Exper. Biol. and Med., vol. 78 (Oct.–Dec. 1951) pp. 28–31.

Halpern et al.: Proceedings Soc. for Exper. Biol. and Med., vol. 79 (Jan.–Apr. 1952) pp. 37–39.

U. S. Dispensatory (U. S. D), 24th ed., 1947, J. B. Lippincott, Co., Philadelphia, Pa., pp 1616–1620.